Patented July 4, 1950

2,513,574

UNITED STATES PATENT OFFICE 2,513,574

HALOGEN THIOPHANTHRAQUINONES

Henry R. Lee and Viktor Weinmayr, Pitman, N. J., assignors to E. I. du Pont de Nemours & Company, Wilmington, Del., a corporation of Delaware No Drawing. Application January 22, 1947, Serial No. 723,673

3 Claims. (Cl. 260—329)

This invention relates to new thiophanthraquinones, and more particularly to the preparation of halogen thiophanthraquinones of the formula:

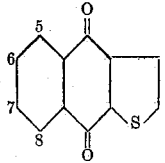

in which one of the positions 6 and 8 are substituted with halogen.

The term "thiophanthraquinone" is employed in the naming of these compounds in view of the original name used by Scholl and Seer, Ann. 394, 131 (1912), who called the corresponding hydrocarbon compound "thiophanthracene."

This invention has for its object the preparation of new halogen containing organic compounds of the thiophanthraquinone series which are suitable for use as intermediates in the preparation of dyes and other compounds. A further object of the invention is to provide a commercially feasible process for the preparation of halogen thiophanthraquinones.

The halogen thiophanthraquinones of the present invention are prepared by ring closing the halogen substituted o-(2-thenoyl) benzoic acids more particularly disclosed in co-pending application Serial No. 723,669 with reagents commonly employed in the ring closure of o-benzoyl benzoic acids. This ring closure may be carried out in sulfuric acid or with aluminum chloride in organic solvents such as nitrobenzene. Alternatively, the ring closure may be carried out in phosphorous pentoxide in solvents such as nitrobenzene.

The halogen o-(2-thenoyl)-benzoic acids which carry the halogen in the benz ring, and which are used as a starting material for the preparation of the compounds of the present invention, may be prepared in good yields and purity by reacting halogenated phthalic anhydrides with the Grignard reagents prepared from the halogenated thiophene. In those cases where two isomeric halogenated o-(2-thenoyl) benzoic acids are obtained, they may be separated by crystallization, selective acidification of their salt solutions, or by taking advantage of the different solubilities of their salts. The Grignard reagent employed in the preparation of these intermediates may be made from either the alpha-bromo or the alpha-iodo thiophene. The reaction between the Grignard reagent and the halogenated phthalic anhydride takes place readily at temperatures of below 0° C. to 70° C.

The following examples are given to illustrate the invention. The parts used are by weight.

Example 1

The condensation of 3-chlorophthalic anhydride with alpha-bromo thiophene by the Grignard reaction gives two isometric chloro-o-(2-thenoyl) benzoic acids, as disclosed in co-pending application Serial No. 723,669. The 3-chloro-o-(2-thenoyl) benzoic acid melts at 128°–129° C., and the 6-chloro-o-(2-thenoyl) benzoic acid melts at 238°–239° C.

Two parts of the 3-chloro-o-(2-thenoyl) benzoic acid melting at 128°–129° C. were dissolved in 18 parts of 95% sulfuric acid. The temperature of the light red solution was raised to from 170° to 175° C. within a few minutes, and maintained there for about one minute. The deep red-brown solution was cooled to about 100° C., and ice was carefully added at this temperature to allow the chloro-thiophanthraquinone to precipitate in a crystalline form. The precipitate was filtered, washed acid free, slurried in dilute sodium carbonate at 60° C., filtered and washed carbonate-free with water. This crude product was vatted with alkaline sodium hydrosulfite at about 60° C. and the red solution of the leuco compound was filtered from some insoluble impurities. Air was blown through the solution to precipitate the 8-chloro-thiophanthraquinone.

1.15 parts of 8-chloro-thiophanthraquinone of a light grey color were obtained, equal to a ring closure yield of 61.8% of theory. Upon several recrystallizations from 3 parts of chlorobenzene per part of product, the pure 8-chloro-thiophanthraquinone was obtained in the form of yellow crystals melting at 225° C.

Example 2

Four (4) parts of 3-chloro-o-(2-thenoyl) benzoic acid, melting at 128°–129° C., were added to a solution of 12 parts of anhydrous aluminum chloride in 80 parts of nitrobenzene. The charge was heated to from 125° to 130° C. for 20 hours to accomplish the ring closure. The charge was then poured into dilute hydrochloric acid, and the nitrobenzene was removed with steam. The crystalline residue was filtered, washed acid free, then boiled in 40 parts of dilute sodium carbonate, filtered and washed with water. The crude 8-chloro-thiophanthraquinone was vatted in about 500 parts of water containing 4 parts of sodium hydroxide, and 5 parts of sodium hydrosulfite.

The filtered red solution was blown with air to precipitate the 8-chloro-thiophanthraquinone, which was filtered off, washed caustic-free and dried at 100° C. 2.9 parts of crude 8-chloro-thiophanthraquinone, melting at from 203° to 226° C., were obtained, equal to a yield of 77.5% of theory. After several recrystallizations from about 25 parts of acetic acid per part of product, the pure 8-chloro-thiophanthraquinone melting at 225° C. was obtained.

Example 3

Five (5) parts of 3-chloro-o-(2-thenoyl) benzoic acid melting at 128°–129° C., and 8 parts of phosphorus pentoxide were heated in 120 parts of nitrobenzene to from 130° to 135° C. for about 18 hours. The reaction mass was then poured onto water, the nitrobenzene was removed with steam, the residue was filtered, washed, extracted with dilute hot caustic, and again filtered and washed.

This crude 8-chloro-thiophanthraquinone was extracted with 200 parts of hot acetic acid. The acetic acid solutions were diluted with water, and the 8-chloro-thiophanthraquinone which precipitated was filtered and washed. Two (2) parts of 8-chloro-thiophanthraquinone melting from 210° to 220° were obtained, equal to a yield of 43% of theory. Upon further recrystallizations from acetic acid, the 8-chloro-thiophanthraquinone was obtained melting at 225° C.

Example 4

19.84 parts of 6-chloro-o-(2-thenoyl) benzoic acid melting at 238°–239° C. were dissolved in 180 parts of 95% sulfuric acid. The solution was heated to 165° C. within a few minutes and maintained at from 165° to 170° C. for about two minutes. It was then cooled to below 100° C. and diluted below that temperature by gradually adding water until all of the ring closed product had precipitated in a crystalline form. The precipitate was filtered, washed acid-free, slurried in dilute warm sodium carbonate, filtered and washed again with water. The crude product was vatted at about 60° C. with alkaline sodium hydrosulfite, the red solution was clarified by filtration, and predominately 8-chloro-thiophanthraquinone was precipitated by oxidizing the leuco compound with air. This compound was separated from some impurities by extracting it with chlorobenzene in a Soxhlet apparatus. 8.5 parts of this 8-chloro-thiophanthraquinone melting from 200° to 211° C. were obtained, equal to a yield of 46% of theory. After two recrystallizations from 7 parts of chlorobenzene per part of product, the predominately 8-chloro-thiophanthraquinone melting at 225° C. was obtained.

Example 5

When 4-chloro-phthalic anhydride was condensed with alpha-bromo thiophene, as described in co-pending application Serial No. 723,669, two isomeric chloro-o-(2-thenoyl) benzoic acids were obtained, the 4-chloro-o-(2-thenoyl) benzoic acid melting at 154°–155° C., and the 5-chloro-o-(2-thenoyl) benzoic acid melting at 225°–226° C.

Four parts of 4-chloro-o-(2-thenoyl) benzoic acid, melting at 154°–155° C., were added to a solution of 12 parts of anhydrous aluminum chloride in 80 parts of nitrobenzene, and the charge was heated to from 125° to 130° C. for about 20 hours. It was then poured into dilute hydrochloric acid and distilled with steam to remove the nitrobenzene. The residue was filtered, washed acid free, extracted with dilute caustic, and washed caustic-free. The filter cake was vatted at about 80° to 90° C. in 200 parts of water containing 4 parts of sodium hydroxide and 4 parts of sodium hydrosulfite. The solution was clarified by filtration and blown with air to precipitate predominately 6-chloro-thiophanthraquinone. 2.66 parts of the light grey 6-chloro-thiophanthraquinone melting at 191°–192° C. were obtained, equal to a yield of 71.2% of theory. After several recrystallizations from Dependip (a high boiling gasoline fraction) requiring for each crystallization about 20 parts of solvent per part of product, predominately 6-chloro-thiophanthraquinone melting at 193°–194° C. was obtained.

Example 6

Five (5) parts of 5-chloro-o-(2-thenoyl) benzoic acid melting at 225°–226° C., 14 parts of anhydrous aluminum chloride and 95 parts of nitrobenzene were heated to from 125° to 130° C. for about 20 hours. The reaction mass was poured into water, the nitrobenzene was distilled off with steam, the residue was filtered, washed acid free, then slurried in dilute aqueous sodium carbonate, filtered and washed free of alkali. This crude 6-chloro-thiophanthraquinone was extracted with Dependip in a Soxhlet apparatus. Four (4) parts of 6-chloro-thiophanthraquinone melting at 190°–191° C. were obtained, equal to a yield of 87.0% of theory. After crystallization from Dependip, requiring about 45 parts of solvent per part of product, the pure 6-chloro-thiophanthraquinone, melting at 192°–193° C. was obtained.

Example 7

The condensation of 4-bromophthalic anhydride with alpha-bromo thiophene produces two isomeric bromo-o-(2-thenoyl) benzoic acids, one melting at 224°–226° C., the other one melting at 145.5°–146° C. It has not been determined which of these keto acils is the 4-bromo-o-(2-thenoyl) benzoic acid and which one is the 5-bromo-o-(2-thenoyl) benzoic acid.

The bromo-o-(2-thenoyl) benzoic acid melting at 224°–226° C. was ring closed as follows:

Two (2) parts of bromo-o-(2-thenoyl) benzoic acid melting at 224°–226° C., 3.2 parts of phosphorous pentoxide and 60 parts of nitrobenzene were heated at from 130° to 135° C. for about 20 hours. The charge was then poured into dilute hydrochloric acid and steam distilled to remove most of the solvent. The precipitate which resulted was filtered, washed acid-free, suspended in about 1% caustic and steam distilled again to remove all traces of nitrobenzene. After filtration and some washing, the crude reaction product was vatted at from 60° to 70° C. in 100 parts of water containing 2 parts of sodium hydroxide and 3 parts of sodium hydrosulfite. The red solution was clarified by filtration and the bromothiophanthraquinone was precipitated by bubbling air through the solution and thereby oxidizing the leuco compound.

1.81 parts of crude bromo-thiophanthraquinone were obtained melting from 197° to 200° C., equal to a yield of 95% of theory. After recrystallizations from Dependip, it had the constant melting range of 201°–202° C.

This product was either the 6-bromo-thiophanthraquinone or the 7-bromo-thiophanthraquinone.

Example 8

Five (5) parts of 3,6-dichloro-o-(2-thenoyl) benzoic acid melting at 145°–146° C., 10 parts of anhydrous aluminum chloride and 90 parts of nitrobenzene were heated at from 95° to 100° C. for 16 hours. The reaction mass was then steam distilled to remove the nitrobenzene, and 4.6 parts of crude 5,8-dichloro-thiophanthraquinone were obtained. The crude product was dissolved in 50 parts of chlorobenzene, the solution was filtered, and then passed through a one inch by six inch column of alumina which had been activated by heating it to from 325° to 350° C. for 8 hours. Impurities were absorbed on the alumina while the pure 5,8-dichloro-thiophanthraquinone passed through with about 2000 parts of chlorobenzene. The solvent was evaporated, and the 5,8-dichloro-thiophanthraquinone thus obtained melted at from 220° to 225° C. After two recrystallizations from 40 parts of glacial acetic acid per part of product, the 5,8-dichloro-thiophanthraquinone melted at from 225° to 228° C.

*Example 9*

Ten (10) parts of 3,4,5,6-tetrachloro-o-(2-thenoyl) benzoic acid melting at 205°–207° C., 28 parts of anhydrous aluminum chloride and 160 parts of nitrobenzene were heated at from 125° to 130° C. for about 20 hours. The charge was then steam distilled, the residue was filtered, washed acid-free, slurried in dilute caustic, washed again, and freed of some gummy impurities by boiling it out with methanol. The 7.9 parts of crude product obtained were extracted with toluene in a Soxhlet apparatus and 6.5 parts of extracted 5,6,7,8-tetrachloro-thiophanthraquinone were obtained melting at 170° to 180° C., equal to a yield of 68.2% of theory. After recrystallizing it from 40 parts of acetic acid per part of product, the pure 5,6,7,8-tetrachloro-thiophanthraquinone melted at 202°–203° C.

The compounds described in the preceding examples have been made by ring closing halogen-o-(2-thenoyl) benzoic acids by means of such reagents as sulfuric acid, anhydrous aluminum chloride or phosphorous pentoxide. The ring closure can be effected by other means, such as heating in anhydrous hydrofluoric acid, or the keto acids can be converted to the acid chlorides and then ring closed with aluminum chloride. The reaction temperatures and times required to accomplish the ring closure will depend upon the method chosen, a fact obvious to anyone familiar with ring closures of this type. Numerous other methods than those described can be chosen for the isolation of the halogen-thiophanthraquinones.

We claim:
1. A mono-halogen substituted thiophanthraquinone of the formula:

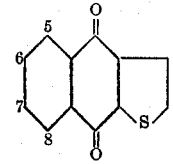

in which one of the positions 6 and 8 is substituted with a halogen of the group consisting of chlorine and bromine.
2. 6-chloro-thiophanthraquinone.
3. 8-chloro-thiophanthraquinone.

HENRY R. LEE.
VIKTOR WEINMAYR.

REFERENCES CITED

The following references are of record in the file of this patent:

Bernthsen and Sudborough, "Organic Chemistry," Von Nostrand, N. Y., 1925 (1922 edition), page 549.

Thomas, "Anhydrous Aluminum Chloride," pages 540, 543, 544 and 547, Reinhold Pub. Co., 1941.